G. WATT.
Wheel Plow.

No. 56,298.

Patented July 10, 1866.

Witnesses:
C. A. Pettit
Jas. L. Ervin

Inventor:
Geo Watt
By Munn & Co
Attorneys

UNITED STATES PATENT OFFICE.

GEORGE WATT, OF RICHMOND, VIRGINIA.

IMPROVEMENT IN PLOWS.

Specification forming part of Letters Patent No. 56,298, dated July 10, 1866.

*To all whom it may concern:*

Be it known that I, GEORGE WATT, of Richmond, in the county of Henrico and State of Virginia, have invented a new and useful Improvement in Plows; and I do hereby declare the following to be a full, clear, and exact description of the construction and operation of the same, reference being had to the annexed drawings, making a part of this specification, in which—

Figure 1:
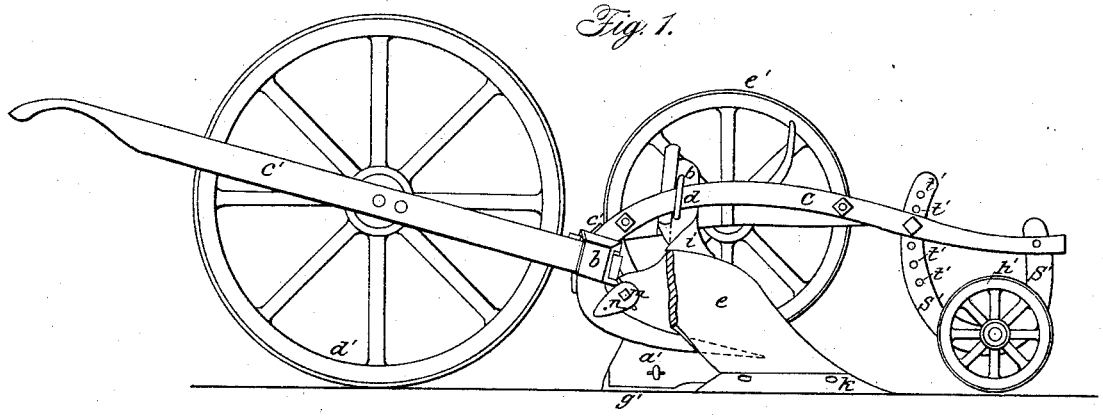
Figure 2:
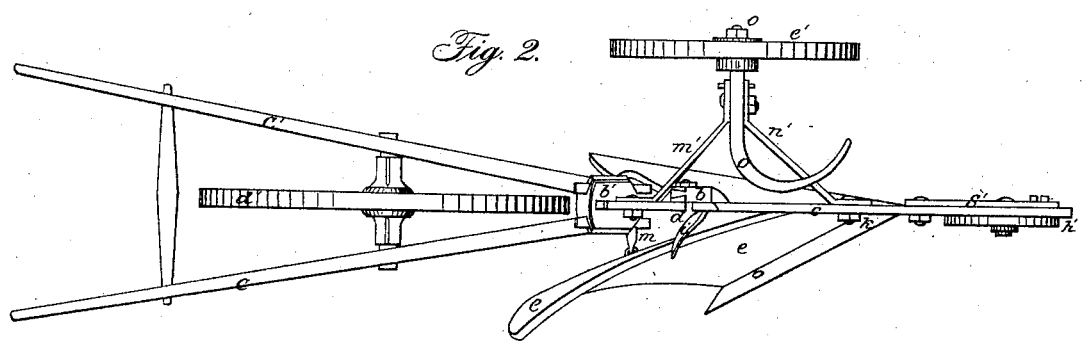
Figure 3:
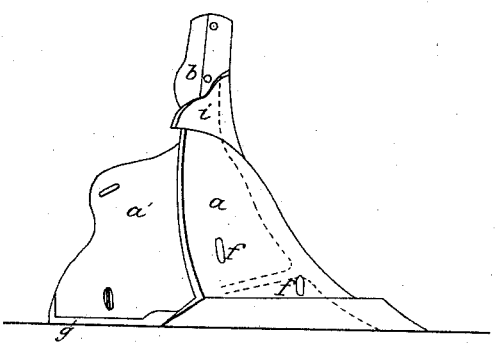
Figure 4:
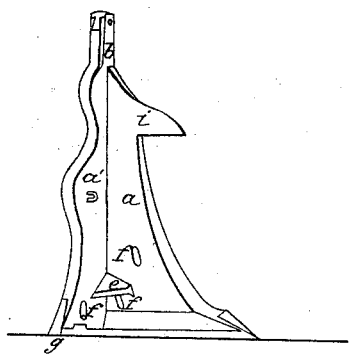
Figure 5:
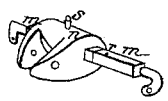

Figure 1 is a side view of my plow, a part of the mold-board being removed. Fig. 2 is a top view of the same. Fig. 3 is a side view of the frame to which the mold-board point and land-side are attached. Fig. 4 is an end view of the same, and Fig. 5 is a view of an adjustable clamp on the brace of the frame.

The nature of my invention consists in providing the plow with a frame made in one piece, to which the mold-board and land-side are attached, said frame being so constructed that the wear and liability to breakage of the frame will be almost entirely obviated and the clogging of the plow from trash and dirt will be in a great degree prevented; and my invention further consists in providing the plow with a curved beam, to which the parts of the plow are connected, the hooked end of which impinges upon the frame behind the central point of greatest resistance on the mold-board, the said beam being also capable of lateral adjustment to prevent side draft or vary the width of the furrows, and of a vertical adjustment to vary the depth of the furrow.

My invention further consists in placing a wheel between the plow-handles in order to bear the weight of the rear portion of the plow and to assist the draft.

To enable others skilled in the art to make and use my invention, I will proceed to describe its construction and operation.

*a a' b i* is the frame of the plow, which is cast in one piece, having one of its sides, *a*, made to conform to the surface of the mold-board, so that the latter may fit accurately upon it. The other side, *a'*, of the frame is made vertical near the ground, but near its upper rear end is curved outwardly in order to throw off any trash or dirt that might accumulate upon it. The curving outwardly of the upper rear end of this side also serves to make the throat or opening between the mold-board and the land-side larger, thereby preventing the accumulation of dirt in said throat.

The part *b* of the frame is the standard of the plow, and forms part of the frame, as before stated.

*e* is the mold-board, the surface of which is made to conform to the side *a* of the frame, to which it is connected by means of staples on the inner surface of the mold-board, which are inserted into holes *f f* in the frame and fastened therein by pins. *g* is the land-side of the plow, which is attached to the frame in the same manner as the mold-board.

The part *i* of the frame is curved outwardly to throw off the dirt, and projects over the mold-board to prevent any liability of a vertical movement of the latter.

*k* is the point of the plow, securely connected with the frame, and projecting, as does the land-side, below the bottom of the frame, thereby, in conjunction with the mold-boad, serving to cover and protect the frame from danger of breakage and liability to wear.

The rear end of the beam *c* is curved, the hooked end of the beam impinging upon the frame behind the point of greatest resistance on the mold-board, thereby applying the power where it is most needed to overcome the resistance.

*l*, Fig. 4, is a brace situated in the front part of the plow-frame, and *m*, Figs. 5 and 2, is a similar brace, connecting the mold-board with the opposite side of the frame.

On the brace *m*, Figs. 2 and 5, there is a sliding piece or clamp, *n*, having an opening in its front end, through which the brace *m* passes, and having projections or arms *o o*, which are made to embrace the curved portion of the beam of the plow. A pin, *s*, Fig. 5, is inserted in the hole in the slide *n*, and through corresponding holes *r r* in the brace, by means of which the beam may be adjusted laterally and an exact center draft may be attained, or the draft may thus be so regulated as to cause the plow to cut wide or narrow furrows.

*b'*, Figs. 1 and 2, is a block, to which the handles of the plow are attached. This block has a slot through its middle, through which the curved part of the plow-beam passes freely.

*c''*, Fig. 1, is a key, which is inserted into the slot between the beam and the outer end of the slot.

By means of this arrangement the plow-beam and point may be elevated and depressed at pleasure, and by the insertion of the key may be fixed in any position, thus regulating the depth of the furrow.

$d'$, Figs. 1 and 2, is a wheel situated between the plow-handles. The axle of this wheel has its bearings in the handles $c'$ $c'$. The wheel $d'$ serves to support the rear part of the plow and assists the draft.

$e'$ is a wheel on the bent axle $o$. This axle is attached loosely by means of a bolt and nut to two arms, $m'$ $n'$, Fig. 2, the latter being attached to the beam. The wheel $e'$ will, by reason of this loose attachment, adapt itself to the inequalities of the ground, and serve to support the plow and keep the sole in the proper position.

$h'$, Figs. 1 and 2, is a wheel on an axle, $r'$, which has its bearing in the curved piece $s'$, one end of which is attached to the plow-beam. In the other end of the piece $s'$ holes $t'$ $t'$ are made, into which a bolt is inserted, passing also through the plow-beam, by means of which the wheel may be raised or lowered.

It will be seen from the above description that all the parts are attached to the plow-beam, which being fastened to the frame at the point of greatest resistance, the draft will be applied at the most advantageous point.

Having thus fully described my invention, what I claim as new, and desire to secure by Letters Patent, is—

1. The frame $a$ $a'$ $b$ $i$, cast in one piece, and constructed as described, in combination with the mold-board $e$, land-side $g$, and point $k$, the whole being constructed and operating in the manner and for the purposes set forth.

2. The curved beam $c$, which is constructed to impinge upon the frame behind the central point of resistance of the mold-board, substantially as described.

3. The beam $c$, in combination with the brace $m$ and adjustable clamp $n$, for affording lateral adjustment to throw the plow in and out of land, substantially as described.

4. In combination with the curved beam $c$, the slotted block $b'$, key $c''$, and wheel journaled to and between the plow-handles, substantially as described.

5. The wheel $d'$, journaled to and between the plow-handles, substantially as described.

To the above specification of an improved plow I have signed my hand this 25th day of May, 1866.

GEO. WATT.

Witnesses:
ALEXR. A. C. KLAUCKE,
CHARLES A. PETTIT.